(12) United States Patent
Suzuki

(10) Patent No.: US 8,322,900 B2
(45) Date of Patent: Dec. 4, 2012

(54) ASSEMBLY STRUCTURE OF VEHICLE ROOM LAMP

(75) Inventor: Ken Suzuki, Makinohara (JP)

(73) Assignee: Yazaki Corporation, Tokyo (JP)

(*) Notice: Subject to any disclaimer, the term of this patent is extended or adjusted under 35 U.S.C. 154(b) by 594 days.

(21) Appl. No.: 12/628,564

(22) Filed: Dec. 1, 2009

(65) Prior Publication Data

US 2010/0157618 A1 Jun. 24, 2010

(30) Foreign Application Priority Data

Dec. 24, 2008 (JP) ................................. 2008-328651

(51) Int. Cl.
*B60Q 1/00* (2006.01)
(52) U.S. Cl. ......... 362/490; 362/147; 362/479; 362/548
(58) Field of Classification Search .................. 362/147, 362/148, 404, 408, 471, 479, 480, 490, 548
See application file for complete search history.

(56) References Cited

U.S. PATENT DOCUMENTS 4,536,829 A * 8/1985 Grimm et al. .................. 362/490
6,467,937 B2 * 10/2002 Nagata et al. ................. 362/490

FOREIGN PATENT DOCUMENTS

| JP | 2001-213233 A | 8/2001 |
|----|---------------|--------|
| JP | 2002-036948 A | 2/2002 |
| JP | 2002036948 A | 2/2002 |
| JP | 2002-301984 A | 10/2002 |

OTHER PUBLICATIONS

Chinese Office Action issued Sep. 15, 2011 in corresponding Chinese Application No. 200910249505.0.

* cited by examiner

*Primary Examiner* — Stephen F Husar
(74) *Attorney, Agent, or Firm* — Sughrue Mion, PLLC

(57) ABSTRACT

The present invention provides an assembly structure of a vehicle room lamp which can be manufactured at low cost and high productivity, and has a low weight. The assembly structure includes an inner housing including a body which has a first surface and a second surface, a bracket portion formed in an outer periphery of the body, and a guide rod extending from the second surface; an outer housing attached to the inner housing on the first surface; a ceiling part including an opening through which the outer housing attached to the inner housing, and an edge of the opening which is supported by the bracket portion; and a reinforcement including a guide hole into which the guide rod is inserted.

6 Claims, 4 Drawing Sheets

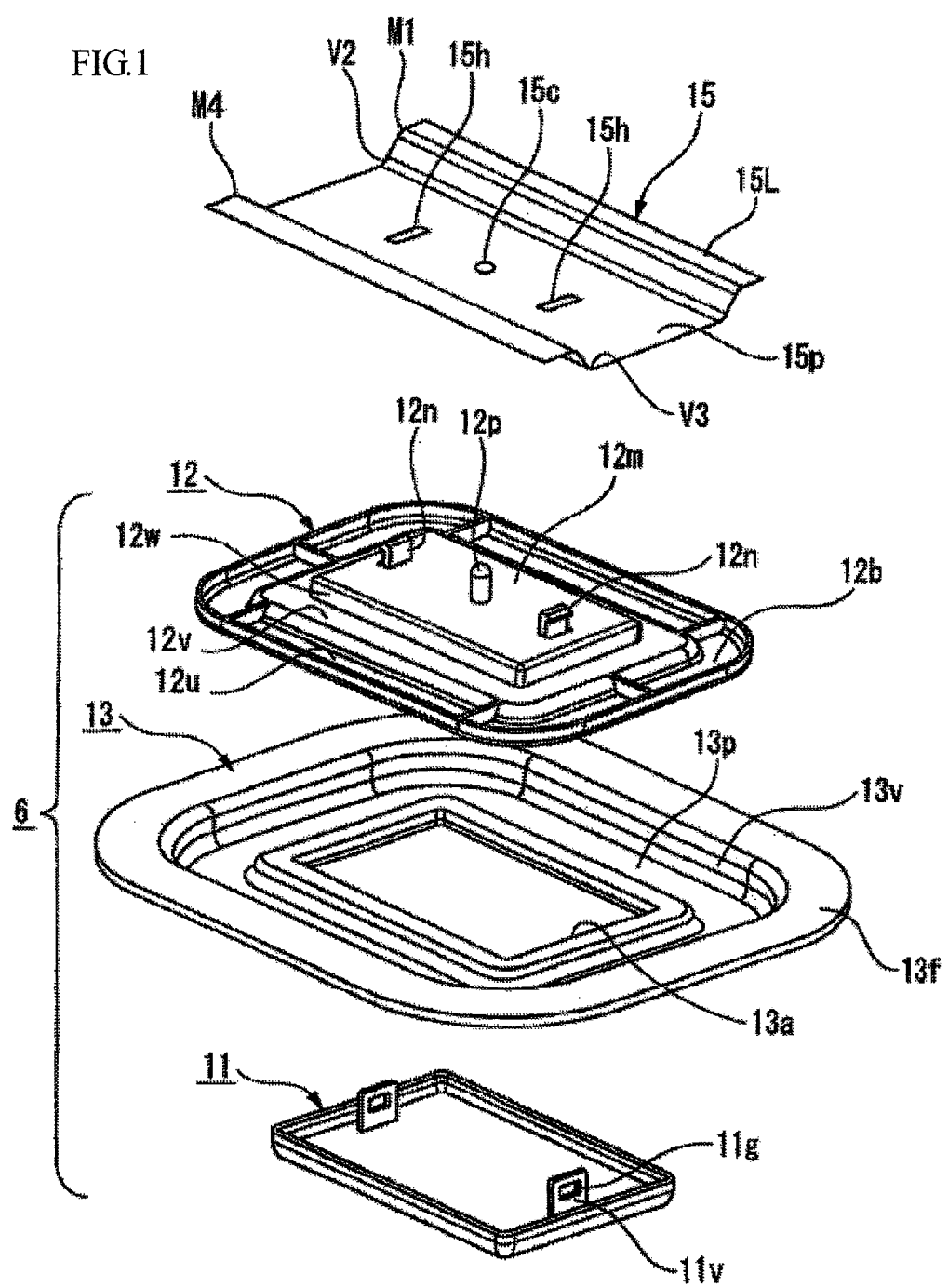

ASSEMBLY STRUCTURE OF VEHICLE ROOM LAMP

CROSS-REFERENCE TO RELATED APPLICATIONS

This application claims priority from Japanese Patent Application No. 2008-328651 filed on Dec. 24, 2008, the entire subject matter of which is incorporated herein by reference.

TECHNICAL FIELD

The present invention relates to an assembly structure of a vehicle room lamp, and more particularly to an assembly structure of a vehicle room lamp whose weight is reduced and which can be smoothly positioned during an assembly.

BRIEF DESCRIPTION OF THE RELATED ART

A related assembly structure of a vehicle room lamp has a head lining as a ceiling which is attached inside a roof panel to attach a room lamp to the ceiling in a vehicle room and the room lamp which is attached from a lower part to a lamp attaching hole provided in the head lining(see JP-A-2002-36948, JP-A-2001-213233).

FIG. 4 is an exploded perspective view for explaining such a related assembly structure of the vehicle room lamp. FIG. 4A shows a perspective view of an entire part after the related assembly structure of the vehicle room lamp is assembled. FIG. 4B is an exploded perspective view of the assembly structure of the vehicle room lamp of FIG. 4A. FIG. 4C is an exploded perspective view of a lamp assembly shown in the lowest part of FIG. 4B.

In FIG. 4, reference numeral 60 of FIG. 4A designates the related assembly structure of the vehicle room lamp. When the assembly structure of the vehicle room lamp is disassembled, a reinforcement 65, a bracket 64, a ceiling 63 and a lamp assembly 66 are obtained from the upper part thereof as shown in FIG. 4B.

The lamp assembly 66 is further divided into an inner housing 62 and an outer housing 61, as shown in FIG. 4C.

<Related Outer Housing 61>

The outer housing 61 is a resin member having a function of a lens for transmitting lamp light from a lamp functional part of the inner housing 62 and includes lock retaining holes 61g in standing members 61v that are engaged with lock pawls of the inner housing 62.

<Related Inner Housing 62>

The inner housing 62 includes therein the lock pawls engaged with the engaging holes 61g of the outer housing 61 and is provided with a plurality of lock pawls 62h (two in the drawing) engaged with lock retaining holes 65h (FIG. 4B) of the reinforcement 65, which are provided at the positions of the upper outside of the inner housing 62 which are corresponding to the lock retaining holes 65h of the reinforcement 65.

Further, a plurality of vertically extending inner housing positioning ribs 62r is provided outside the inner housing 62.

<Related Ceiling 63>

The ceiling 63 is formed with a resin of a rectangular configuration in plan view which literally forms a ceiling part when a vehicle room lamp is attached to an upper part of a vehicle, and includes a flat bottom surface part 63p in a central part, a wall surface part 63v provided upright in the periphery thereof and a flange 63f extending horizontally outside from the wall surface part 63v. In the center of the bottom surface part 63p, an opening 63 for a lamp is provided. Through the opening, the inner housing 62 having a structure of parallelepiped passes.

<Related Bracket>

The bracket 64 is a reinforcing member for increasing the strength of the ceiling 63 when the ceiling 63 is attached to the reinforcement 65 and partly has the same form as that of a back surface side of the ceiling 63. Thus, the bracket is securely fixed to the back surface of the ceiling 63 by an adhesive agent. In the central part of the bracket, an opening part for a lamp through which the inner housing 62 having the structure of parallelepiped passes is opened with the same size as that of the opening part 63a for the lamp.

<Related Reinforcement 65>

The reinforcement 65 is attached to the ceiling frame of the vehicle to support the entire part of a vehicle room lamp. The reinforcement 65 is a bent plate formed with one rectangular metal plate having one side 65L by forming sequentially a crest forming fold M1, a valley forming fold V2, a valley forming fold V3 and a crest forming fold M4 in parallel with the side 65L for each prescribed distance from the side 65L to have a flat bottom surface 65p in a lower part. On the bottom surface 65p, the lock retaining holes 65h are opened at a plurality of positions (two in the drawing). The lock pawls 62h of the inner housing 62 are engaged with the lock retaining holes 65h so that the entire part of the assembly structure 60 of the vehicle room lamp is assembled.

As described above, the lock pawls of the inner housing 62 are engaged with the lock retaining holes 61g of the outer housing 61 to form the lamp assembly 66 and the bracket 64 is stuck to the back surface of the ceiling 63 by an adhesive agent or the like to form a ceiling assembly.

In such a way, the related assembly structure 60 of the vehicle room lamp includes, in order from a lower part, the outer housing 61, the inner housing 62, the ceiling 63, the bracket 64 and the reinforcement 65.

<The First Disadvantage of Related Assembly Structure 60 of Vehicle Room Lamp>

The applicant of the present invention found that the bracket 64 as the reinforcing member increases manufacturing cost among the members forming the usual assembly structure 60 of the vehicle room lamp. Further, the bracket 64 also causes a weight to increase. In addition thereto, since one process is added for forming the ceiling assembly by sticking the bracket 64 to the back surface of the ceiling 63 by the adhesive agent, productivity is affected thereby.

<The Second Disadvantage of Usual Assembly Structure of Vehicle Room Lamp>

When the lock pawls 62h of the inner housing 62 are engaged with the lock retaining holes 65h of the reinforcement 65, the inner housing 62 is inserted into the opening part 63a for the lamp of the ceiling 63. In that case, the inner housing positioning ribs 62r provided in the inner housing 62 are allowed to abut on the outer periphery of the opening part 63a for the lamp of the ceiling 63 so that the inner housing is positioned. However, when a failure in a proper positioning operation arises during an attachment so that the inner housing positioning ribs 62r are allowed to abut on the outer periphery of the opening part 63a for the lamp under a state that the ribs 62r are biased against the outer periphery of the opening part 63a for the lamp, a load may be possibly exerted on the ceiling 63 to deform the ceiling 63.

<Patent Literature for Solving the Second Disadvantage>

In order to prevent the failure in the proper positioning during the attachment, the invention is proposed that includes a guide hole and a guide pin (see JP-A-2002-301984).

However, the guide hole and the guide pin are attached between a room lamp and a roof trim and are not attached to reinforcement. Further, many members are required to attach the guide hole and the guide pin to the reinforcement, which disadvantageously causes a cost to increase and affects a productivity.

SUMMARY

The present invention is proposed to solve the above-described disadvantages and it is a first object of the present invention to provide an assembly structure of a vehicle room lamp in which a cost is reduced, a weight is decreased and productivity is good by making such a contrivance as not to use a bracket 64.

Further, it is a second object of the present invention to assuredly position an inner housing 62 in an outer periphery of an opening part 63a for a lamp during an attachment and prevent a ceiling 63 from being deformed.

A first aspect of the present invention is an assembly structure of a vehicle room lamp including: an inner housing including a body which has a first surface and a second surface, a bracket portion formed in an outer periphery of the body, and a guide rod extending from the second surface; an outer housing attached to the inner housing on the first surface; a ceiling including an opening through which the outer housing attached to the inner housing, an upper side which has a form along a form of the bracket portion and abuts the bracket portion, and an edge of the opening which is supported by the bracket portion; and a reinforcement including a guide hole into which the guide rod is inserted.

With such a structure, a bracket as a single member used in the related device is omitted, and the bracket portion is formed in the outer periphery of the inner housing. Therefore, a process to stick the usual bracket as the single member to the back surface of a ceiling by an adhesive agent may be omitted. Thus, a cost can be reduced and productivity can be improved.

Further, in case where the bracket portion has the form along the form of the upper side of the ceiling, the bracket portion abuts on the upper side of the ceiling, and accordingly, the looseness of the ceiling is prevented and the strength of the ceiling is increased.

Further, since the guide rod of the inner housing is inserted into the guide hole of the reinforcement, the inner housing can be assuredly positioned and a breakage can be prevented.

A second aspect of the present invention is the assembly structure of the vehicle room lamp according to the first aspect in which the inner housing includes a retaining protrusion and the reinforcement includes a retaining hole with which the retaining protrusion is engaged. Preferably, a length of the guide rod is longer than that of the retaining protrusion.

With such a structure, since the height of the guide rod of the inner housing is larger than the height of the second engaging parts of the inner housing, when the inner housing formed integrally with the bracket is attached to the reinforcement, the second engaging parts of the inner housing can be prevented from being broken. Further, since the ceiling and the inner housing formed integrally with the bracket are positioned together to the same reinforcement, an influence due to an unevenness of the opening part of the ceiling can be suppressed.

A third aspect of the present invention is the assembly structure according to the first aspect in which the outer housing has an supporting edge and the supporting edge and the bracket portion support and sandwich the edge of the opening.

With such a structure, the edge of the opening is supported by the bracket portion and the supporting edge, the strength of the ceiling is enhanced.

As described above, according to the present invention, the bracket as the single member used in the usual device is omitted, and the bracket portion is formed in the outer periphery of the inner housing. Accordingly, the process to stick the bracket to the back surface of the ceiling by the adhesive agent may be omitted. Thus, the cost can be reduced and the productivity can be improved.

Further, the looseness of the ceiling is prevented and the strength of the ceiling and the inner housing is increased.

Further, since the guide rod of the inner housing is inserted into the guide hole of the reinforcement, the inner housing can be assuredly positioned and a breakage can be prevented.

Since the length of the guide rod of the inner housing is longer than that of the retaining projection of the inner housing, when the inner housing formed integrally with the bracket is attached to the reinforcement, the retaining projection of the inner housing can be prevented from being broken.

Further, since the ceiling and the inner housing formed integrally with the bracket are positioned together to the same reinforcement, an influence due to an unevenness of the opening part of the ceiling can be suppressed.

BRIEF DESCRIPTION OF THE DRAWINGS

FIG. 1 is an exploded perspective view showing an assembly structure of a vehicle room lamp.

FIG. 2A is a perspective view of the entire part and FIG. 2B is a sectional view taken along a line A-A of FIG. 2A.

FIG. 4A shows a perspective view of an entire part after the related assembly structure of the vehicle room lamp is assembled. FIG. 4B is an exploded perspective view of the assembly structure of the vehicle room lamp of FIG. 4A. FIG. 4C is an exploded perspective view of a lamp assembly shown in the lowest part of FIG. 4B.

DETAILED DESCRIPTION OF EXEMPLARY EMBODIMENTS OF THE PRESENT INVENTION

Figure 2A:
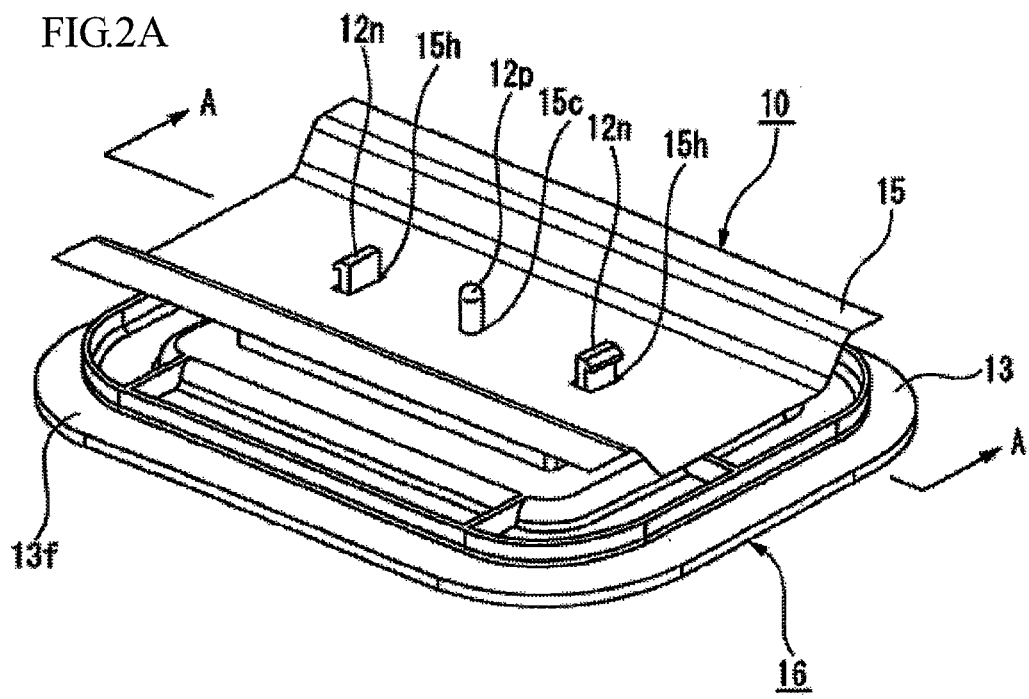
FIGS. 2A to 2B are diagrams for explaining an entire part of the assembly structure of the vehicle room lamp after an attachment is completed.

Now, an assembly structure of a vehicle room lamp according to the present invention will be described below.

FIG. 1 is an exploded perspective view showing the assembly structure of the vehicle room lamp. Reference numeral 15 designates a reinforcement and 16 designates a room lamp housing. The room lamp housing 16 includes, in order from a lower part, an outer housing 11, a ceiling 13 and an inner housing 12.

<Inner Housing 12>

The inner housing 12 is a member made of a resin including a parallelepiped main body part 12m in which a lamp functional part is housed and a bracket portion 12b in an outer periphery thereof.

The main body part 12m includes therein lock pawls 12g (FIG. 2B) engaged with engaging holes 11g of the outer housing 11 and is provided with a plurality of lock pawls 12n (two in the drawing) engaged with lock retaining holes 15h of the reinforcement 15, which are provided at the positions of the upper parts of an outer part corresponding to the lock retaining holes 15h of the reinforcement 15.

<<Feature 1>>

A feature of the present exemplary embodiment resides in that the bracket portion 12b is formed integrally in the outer periphery of the inner housing 12. The bracket portion 12b includes horizontal portions 12h extending horizontally from four side walls 12w of the main body part 12m respectively and U-shaped grooves 12u at their ends. The horizontal portions 12h and the U-shaped grooves 12u abut on a bottom surface part 13p of the ceiling 13 to prevent the looseness of the ceiling 13 and improve the strength of the ceiling.

<<Feature 2>>

Further, in the present exemplary embodiment, a guide rod 12p stands upright in a central part between the two lock pawls 12n on the upper parts of the outer part of the main body part 12m. The guide rod 12p is inserted into a guide hole 15c of the reinforcement 15 that is similarly provided in the present exemplary embodiment.

The height of the guide rod 12p is made to be larger than the height of the lock pawls 12n. Thus, since the guide rod 12p comes into contact with the reinforcement 15 earlier than the lock pawls 12n and serves as a forerunner and a guide, the lock pawls 12n are smoothly guided and protected.

According to the present exemplary embodiment, since the guide rod 12p is provided, the usual inner housing positioning ribs 62r (FIG. 4C) provided outside the inner housing can be removed.

<Attaching Position of Inner Housing 12 is Different from that of Related Art>

Now, a position where the inner housing 12 is attached will be described below.

Figure 4A:
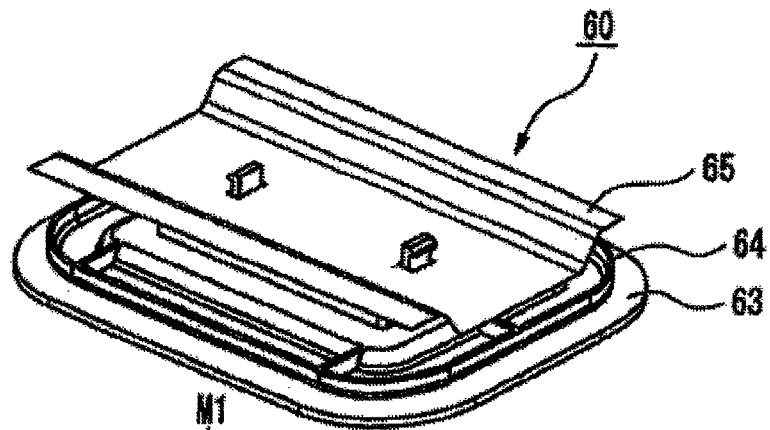
FIGS. 4A to 4C are exploded perspective views for explaining a related assembly structure of a vehicle room lamp.
Figure 4B:
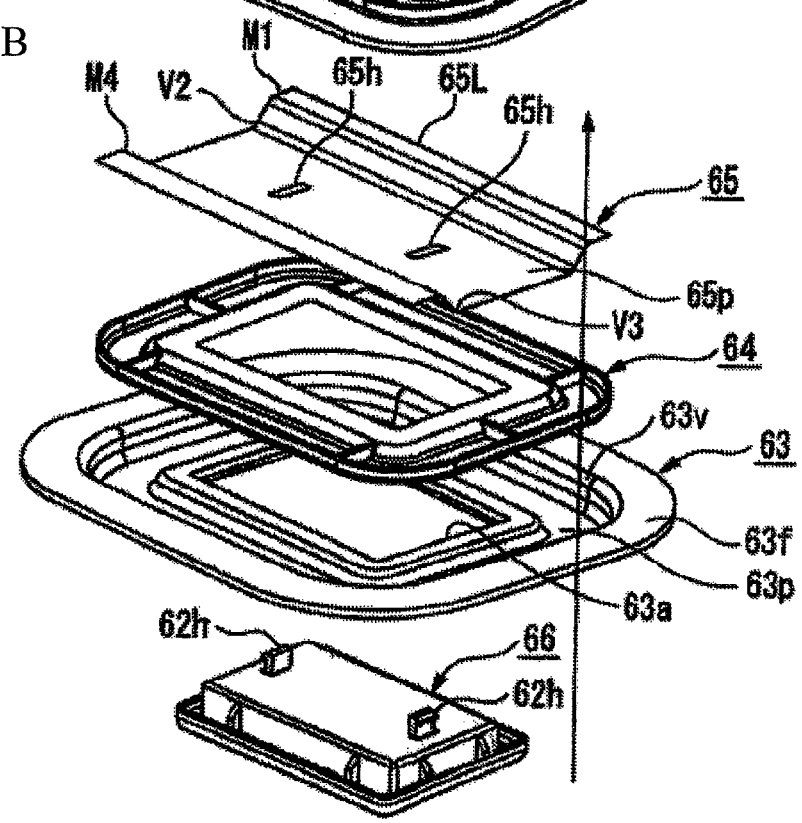
Figure 4C:
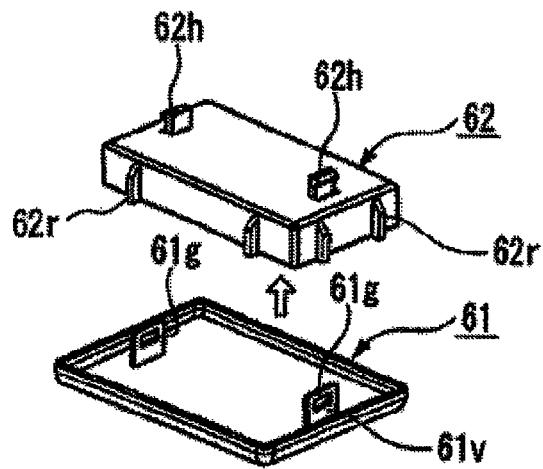

As compared with FIGS. 4A to 4C (a related art), it is understood that the bracket 64 used in the related device is not provided in the present invention. Further, the inner housing 12 is located in the upper part of the ceiling 13 (In FIG. 4, the inner housing 62 is located in the lower part of the ceiling 63.). The bracket portion 12b of the inner housing 12 abuts on the ceiling 13.

The bracket portion 12b of the inner housing 12 reinforces the ceiling 13 and prevents the looseness of the ceiling 13.

<Outer Housing 11>

The outer housing 11 is a resin member of a rectangular form in plan view that has a function of a lens for transmitting lamp light from the lamp functional part of the inner housing 12. Long upright members 11v stand in central positions of two opposed sides of the rectangular form. Lock retaining holes 11g engaged with the lock pawls 12g (FIG. 3A) of the inner housing 12 are provided in upper parts of the upright members 11v.

<Ceiling 13>

The ceiling 13 is formed with a resin of a rectangular configuration in plan view which literally forms a ceiling part when a vehicle room lamp is attached to an upper part of a vehicle, and includes a flat bottom surface part 13p in a central part, a wall surface part 13v provided upright in the periphery thereof and a flange 13f extending horizontally outside from the wall surface part 13v. In the center of the bottom surface part 13p, an opening part 13a is opened for a lamp through which the inner housing 12 having the structure of the parallelepiped passes. The bottom surface part 13p, the wall surface part 13v and the flange 13f are respectively formed to be light and thin and extended outward to wide areas. Thus, their strength is not so high.

<Reinforcement 15>

The reinforcement 15 is attached to the ceiling frame of the vehicle to support the entire part of a lighting device. The reinforcement 15 is a bent plate formed with one rectangular metal plate having one side 15L by forming sequentially a crest forming fold M1, a valley forming fold V2, a valley forming fold V3 and a crest forming fold M4 in parallel with the side 15L for each entry of a prescribed distance inside of the side 15L to have a flat bottom surface 15p in a lower part. On the protruding bottom surface 15p, the lock retaining holes 15h are opened at a plurality of positions (two in the drawing).

<<Feature 1>>

Further, in the present exemplary embodiment, the guide hole 15c is provided between the two lock retaining holes 15h of the reinforcement 15. The guide rod 12p standing upright on the inner housing 12 is inserted into the guide hole 15c for positioning the inner housing 12 relative to the reinforcement 15.

Further, since the length of the guide rod 12p is longer than that of the lock pawls 12n, the guide rod 12p comes into contact with the reinforcement 15 earlier than the lock pawls 12n and serves as a forerunner and a guide. Accordingly, the lock pawls 12n are smoothly guided and prevented from being deformed.

<Method for Attaching Inner Housing 12 to Reinforcement 15>

In order to attach the inner housing 12 to the reinforcement 15, initially, since the guide rod 12p of the inner housing 12 is inserted into the guide hole 15c of the reinforcement 15 to position the inner housing relative to the reinforcement 15, and then, the lock pawls 12n of the inner housing 12 are inserted into the lock retaining holes 15h of the reinforcement 15, the lock pawls 12n are smoothly guided to the lock retaining holes 15h. Since the lock pawls 12n do not suddenly come into contact with the reinforcement 15 as in a related art, the lock pawls 12n are prevented from being deformed.

The lock pawls 12n are engaged with the lock retaining holes 15h, so that the assembly structure 10 of the vehicle room lamp is completed.

Figure 2B:
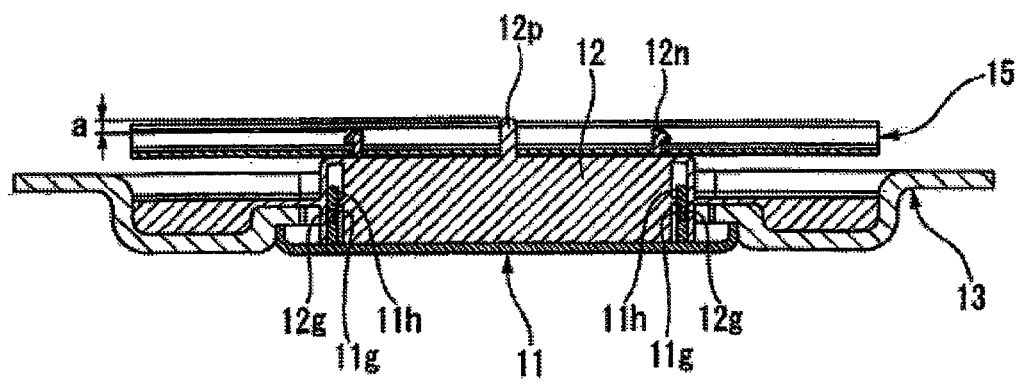

FIGS. 2A and 2B are views for explaining the entire part of the assembly structure 10 of the vehicle room lamp after the attachment is completed. FIG. 2A is a perspective view of the entire part and FIG. 2B is a sectional view taken along a line A-A in FIG. 2A.

In FIG. 2A, when the guide rod 12p of a large height standing upright on the inner housing 12 is inserted into the guide hole 15c of the reinforcement 15, other lock pawls 12n can be smoothly engaged with the lock retaining holes 15h of the reinforcement 15 and the lock pawls 12n can be protected. In FIG. 2B, the guide rod 12p is formed so that its height is larger than that of the lock pawls 12n (the length of the guide rod 12p is longer than that of the lock pawls 12n). Thus, the guide rod 12p is inserted into the guide hole 15c of the reinforcement 15 before the lock pawls 12n reache the reinforcement 15. Thus, the lock pawls 12n can be smoothly engaged with the lock retaining holes 15h of the reinforcement 15 so that the lock pawls 12n may be protected.

Now, a procedure for assembling the above-mentioned members will be described below by referring to FIGS. 3A to 3C.

<Procedure of Assembly>

Figure 3A:
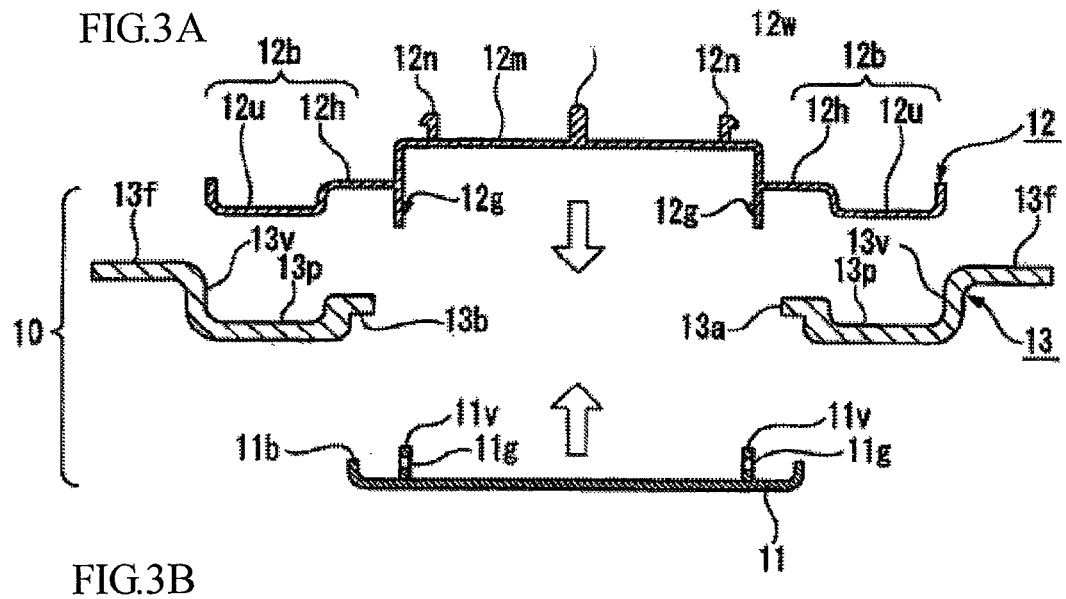
FIGS. 3A to 3C are sectional views showing a procedure for assembling the assembly structure of the vehicle room lamp shown in FIGS. 2A and 2B.
Figure 3B:
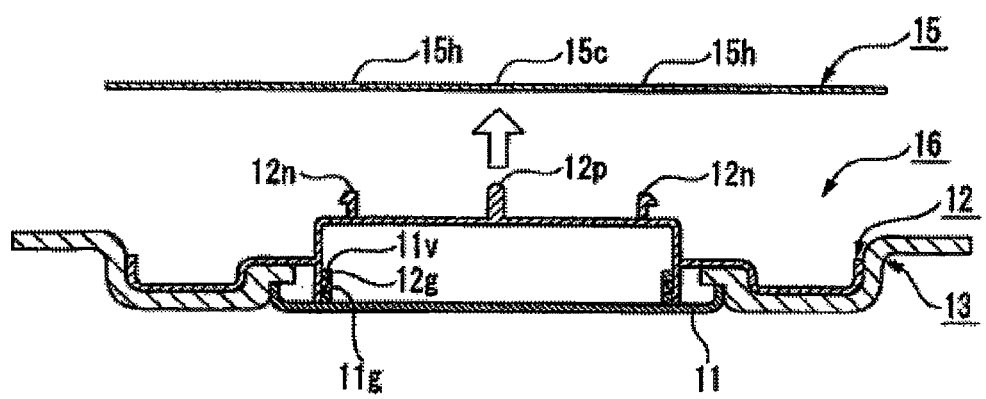
Figure 3C:
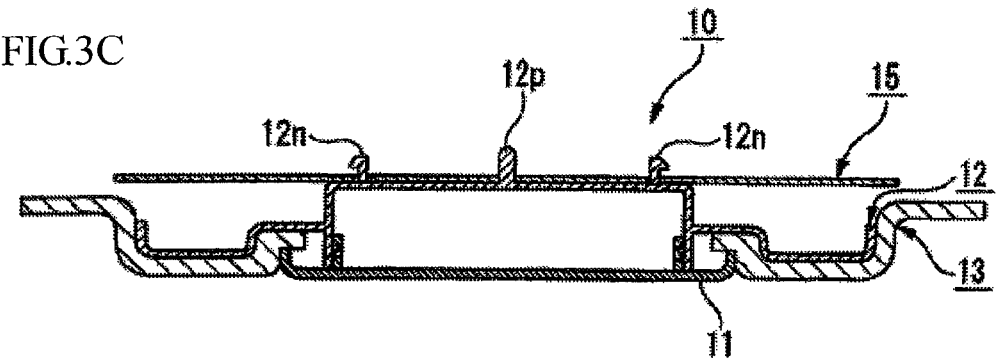

FIGS. 3A to 3C are sectional views showing the procedure for assembling the assembly structure of the vehicle room lamp shown in FIG. 2A and 2B and an assembly work progresses in order from FIG. 3A to FIG. 3C.

The ceiling 13 (FIG. 3A) has a form in which the flange 13f is extended horizontally outside from the wall surface part 13v standing upright in the periphery of the bottom surface part 13p lowered from a peripheral edge part 13b forming the opening part 13a for the lamp in the central part.

On the other hand, in the outer housing (FIG. 3A), the lock retaining holes 11g engaged with the lock pawls 12g of the inner housing 12 are provided in the upright members 11v and upright walls 11b (example embodiment of a supporting edge of the outer housing 11) standing upward are provided in four peripheral edges.

Further, in the inner housing 12, the lock engaging pawls 12g including inclined surface parts in lower parts are provided inside the main body part 12m so as to be engaged with the engaging holes 11g of the outer housing 11.

Further; in the upper parts of the outer part of the main body part 12m, the guide rod 12p and the two lock pawls 12n are provided so as to be respectively engaged with the guide hole 15c and the lock retaining holes 15h of the reinforcement 15 (FIG. 3B).

The bracket portion 12b provided in the outer periphery of the inner housing 12 in the present exemplary embodiment includes the horizontal portions 12h and the U-shaped grooves 12u, a sectional form of which partly corresponds to the form of the upper surface (a back side) of the ceiling 13.

In FIG. 3A, when the ceiling 13 is sandwiched between the outer housing 11 from a lower part and the inner housing 12 from an upper part, the lock retaining holes 11g of the outer housing 11 are engaged with the lock pawls 12g of the inner housing 12. Thus, the peripheral edge part 13b of the ceiling 13 between them is sandwiched and held between the head part of the upright wall 11b of the outer housing 11 and the horizontal part 12h of the bracket portion 12b of the inner housing 12. Further, the bottom surface part 13p and the wall surface part 13v of the ceiling 13 abut on the U-shaped groove 12u at the end of the horizontal part 12h of the bracket portion 12b of the inner housing 12 provided in the present exemplary embodiment. Thus, the looseness of the ceiling 13 is prevented and the strength of the ceiling is enhanced. FIG. 3B shows the room lamp housing 16 and the reinforcement 15 which are formed integrally in such a way.

Then, the reinforcement 15 is engaged with the room lamp housing. In that case, in FIG. 3B, the guide rod 12p is inserted into the guide hole 15c of the reinforcement 15. Then, the lock pawls 12n of the inner housing 12 are engaged with the lock retaining holes 15h. Thus, the assembly structure 10 of the vehicle room lamp (FIG. 2A) is completed.

In the above-described assembly, after the room lamp housing 16 is assembled in advance, the room lamp housing 16 is attached to the reinforcement 15. However, an assembling order is not limited thereto, and the inner housing 12 may be attached to the reinforcement 15 in advance; and then, the outer housing 11 and the ceiling 13 may be attached to the inner housing 12 from a lower part.

<Advantage 1 of the Present Invention>

As can be understood from FIG. 3A, according to the present exemplary embodiment, the bracket 64 (FIG. 4) as a single member used in the related art is omitted, and the bracket portion 12b is formed in the outer periphery of the inner housing 12. Therefore, the process to stick the related bracket as the single member to the back surface of the ceiling by the adhesive agent may be omitted. Thus, the cost can be reduced and the productivity can be improved.

Further, since an abutting surface for positioning is not necessary in the opening part of the ceiling, the opening part of the ceiling is not damaged.

Further, the bottom surface part 13p and the wall surface part 13v of the ceiling 13 are allowed to abut on the bracket portion 12b of the inner housing 12 so that the looseness of the ceiling 13 may be prevented and the strength of the ceiling may be improved.

In the invention disclosed in the patent literature 1, a bracket is also eliminated, however, since a function of a usual bracket is lost, the looseness of a ceiling cannot be prevented.

Since the exemplary embodiment of the present invention has the above-described structure, the looseness of the ceiling 13 can be prevented and the strength of the ceiling can be improved.

<Advantage 2 of the Present Invention>

Further, according to the present exemplary embodiment, the positioning ribs 62r (FIG. 4C) provided outside the related inner housing are omitted, and the guide rod 12p is provided upright on the inner housing 12 and used for positioning the inner housing 12 when the inner housing 12 is attached to the reinforcement 15. Thus, when the guide rod 12p of the inner housing is inserted into the guide hole 15c of the reinforcement, the inner housing can be smoothly and assuredly positioned.

Since the height of the guide rod 12p of the inner housing 12 is larger than the height of the lock pawls 12n of the inner housing 12, the lock pawls 12n can be prevented from being broken when the inner housing 12 is attached to the reinforcement.

Further, since the ceiling 13 and the inner housing 12 are also positioned to the same reinforcement 15, an influence due to an unevenness of the opening part 13a for the lamp can be suppressed.

As above described assembly structure of a vehicle room lamp is one of exemplary embodiment thereof. Any additional modification is possible not beyond the scope of the present invention.

The invention claimed is:

1. An assembly structure of a vehicle room lamp comprising:
   an inner housing including a body which has a first surface and a second surface, a bracket portion formed in an outer periphery of the body, and a guide rod extending from the second surface;
   an outer housing attached to the inner housing on the first surface;
   a ceiling including an opening through which the outer housing attached to the inner housing, an upper side which has a form along a form of the bracket portion and abuts the bracket portion, and an edge of the opening which is supported by the bracket portion; and
   a reinforcement including a guide hole into which the guide rod is inserted.

2. The assembly structure according to claim 1, wherein the inner housing includes a retaining protrusion and the reinforcement includes a retaining hole with which the retaining protrusion is engaged.

3. The assembly structure according to claim 2, wherein a length of the guide rod is longer than that of the retaining protrusion.

4. The assembly structure according to claim 1, wherein the outer housing has an supporting edge, and the supporting edge and the bracket portion support and sandwich the edge of the opening.

5. The assembly structure according to claim 1, wherein the ceiling has a flat bottom surface around the edge of the opening, a wall surface provided upright in the periphery of the bottom surface, and a flange extending horizontally outside from the wall surface.

6. The assembly structure according to claim 5, wherein the main body has a side wall and the bracket portion has a horizontal portion extending horizontally from the side wall, and U-shaped groove at the end of the horizontal portion, wherein the U-shaped groove abuts the bottom surface and the wall surface.

* * * * *